United States Patent
Kuo

(10) Patent No.: US 7,227,857 B2
(45) Date of Patent: Jun. 5, 2007

(54) CORRECTION TO HFN INITIALIZATION FOR RB2 DURING SRNS RELOCATION

(75) Inventor: Lee-Chee Kuo, Hsin-Chu (TW)

(73) Assignee: Innovative Sonic Limited, Road Town, Tortola (VG)

( * ) Notice: Subject to any disclaimer, the term of this patent is extended or adjusted under 35 U.S.C. 154(b) by 902 days.

(21) Appl. No.: 10/250,278

(22) Filed: Jun. 19, 2003

(65) Prior Publication Data

US 2003/0235213 A1 Dec. 25, 2003

Related U.S. Application Data

(60) Provisional application No. 60/319,338, filed on Jun. 21, 2002.

(51) Int. Cl.
*H04J 3/06* (2006.01)

(52) U.S. Cl. ........................ 370/350; 370/331; 370/252; 455/436; 455/438; 455/502

(58) Field of Classification Search ........ 455/410–411, 455/412.1, 435.1–3, 436, 438–439, 502; 370/349–350, 252, 331, 351–352; 380/201, 380/239, 273–285, 229
See application file for complete search history.

(56) References Cited

U.S. PATENT DOCUMENTS

| | | | | |
|---|---|---|---|---|
| 6,690,661 B1 * | 2/2004 | Agarwal et al. | ............ | 370/337 |
| 6,765,885 B2 * | 7/2004 | Jiang et al. | .................. | 370/328 |
| 6,870,932 B2 * | 3/2005 | Jiang | .......................... | 380/273 |
| 6,925,183 B2 * | 8/2005 | Jiang et al. | .................. | 380/278 |
| 7,116,667 B2 * | 10/2006 | Jiang et al. | .................. | 370/394 |
| 2003/0044011 A1 * | 3/2003 | Vialen et al. | ............... | 380/201 |

* cited by examiner

*Primary Examiner*—Matthew D. Anderson
*Assistant Examiner*—Tuan Tran
(74) *Attorney, Agent, or Firm*—Birch, Stewart, Kolasch & Birch, LLP

(57) ABSTRACT

A user equipment (UE) transmits a first START value to a serving radio network controller (RNC), and utilizes the first START value as a most-recently transmitted START value. A serving radio network subsystem (SRNS) relocation procedure is then initiated between the UE, the serving RNC and a target RNC. In response to the SRNS relocation procedure, the serving RNC transmits a SRNS relocation information container to the target RNC. The SRNS relocation information container includes the START value of each CN domain and the Latest configured core network (CN) domain. The target RNC utilizes the START value of the Latest configured CN domain to initialize the hyperframe numbers (HFNs) of radio bearer RB2. The UE reestablishes RB2 and utilizes the first START value to initialize the HFNs of RB2. The UE then transmits a response message to the target RNC on RB2.

12 Claims, 4 Drawing Sheets

CORRECTION TO HFN INITIALIZATION FOR RB2 DURING SRNS RELOCATION

CROSS REFERENCE TO RELATED APPLICATIONS

This application claims the benefit of U.S. Provisional Application No. 60/319,338, filed Jun. 21, 2002, and included herein by reference.

BACKGROUND OF INVENTION

1. Field of the Invention

The present invention relates to a wireless communications system. More particularly, the present invention relates to synchronizing hyper-frame numbers during a SRNS relocation procedure in a 3GPP wireless system.

2. Description of the Prior Art

As explained in the $3^{rd}$ Generation Partnership Project (3GPP) specifications 3GPP TS 25.322 V3.10.0 "RLC Protocol Specification", and 3GPP TS 25.331 V3.10.0 "Radio Resource Control (RRC) Specification", which are included herein by reference, serving radio network subsystem (SRNS) relocation is performed to transfer user equipment (UE) from one radio network controller (RNC) to another RNC. Various reconfiguration procedures may involve SRNS relocation, which is indicated by certain information elements (IEs) included in the reconfiguration message.

When receiving a reconfiguration message indicating that SRNS relocation is to occur, the UE re-establishes the radio link control (RLC) entity of radio bearer RB2, and re-initializes the uplink and downlink hyper frame number (HFN) components of the COUNT-Cs for RB2 with MAX (uplink HFN of RB2, downlink HFN of RB2)+1, where MAX(a, b) gives the larger of a and b. The UE also calculates the START value for each core network (CN) domain according to subclause 8.5.9 of the RRC specification TS 25.331 V3.10.0, and includes these START values in the IE "START list" in the response message.

The UE then transmits the response message to the UTRAN on RB2, thereby providing the UTRAN with most recently transmitted START values. After the RLC has confirmed the successful transmission of the response message, the UE re-establishes the RLC entities of other radio bearers and re-initializes the HFN of the COUNT-C values for each radio bearer with the START value included in the response message for the corresponding CN domain.

As described in the prior art, in the event that SRNS relocation is involved in a reconfiguration procedure, the UE shall re-establish the RLC entities of RB2 and re-initialize the HFN of the COUNT-C for the radio bearer before transmitting the response message.

For the Target RNC to be able to decipher the response message sent by the UE on RB2, the UL COUNT-C of the UE and the UTRAN have to be initialised with the same value, i.e. MAX (uplink HFN component of COUNT-C of RB2, downlink HFN component of COUNT-C of RB2)+1. The UL HFN and DL HFN of RB2 are provided to the Target RNC by the Source RNC in an SRNS Relocation Info container. The data in the SRNS Relocation Info container is forwarded via the CN. There is a possibility that between the time at which the Source RNC evaluates the HFN and the instant when the UE does so, some RRC messages may be sent on the UL of RB2 (for example, Measurement Report messages). If the UL HFN of RB2 is greater than the DL HFN of RB2, and if the RLC sequence numbers on the UL of RB2 are close to roll over, such messages may trigger an HFN increment in the UE but not in the UTRAN, as those messages might not have been considered when the UL HFN is sent from the Source RNC to the Target RNC. Under such circumstances, the COUNT-C of RB2 will not be initialised with the same value in the two entities (i.e., the UE RLC entity and the Target RNC RLC entity). If this happens, the Target RNC will be unable to correctly decipher the response message, and the SRNS relocation procedure will consequently fail.

The SRNS relocation may also be initiated by a cell update procedure, and in which case the above-noted problem continues to exist.

SUMMARY OF INVENTION

It is therefore a primary objective of this invention to provide a method for correcting HFN initialization for RB2 during SRNS relocation.

In a preferred embodiment, the present invention discloses a method, and associated wireless devices, for synchronizing hyper-frame numbers (HFNs) during a serving radio network subsystem (SRNS) relocation procedure. A user equipment (UE) transmits a first START value to a serving radio network controller (RNC), and utilizes the first START value as a most-recently transmitted START value. A SRNS relocation procedure is then initiated between the UE, the serving RNC and a target RNC. In response to the SRNS relocation procedure, the serving RNC transmits a SRNS relocation information container to the target RNC. The SRNS relocation information container includes the IE "START" of each CN domain and the IE "Latest configured core network (CN) domain". The target RNC utilizes the START value of the Latest configured CN domain to initialize the hyper-frame numbers (HFNs) of radio bearer RB2. The UE re-establishes RB2 and utilizes the first START value to initialize the HFNs of RB2. The UE then transmits a response message to the target RNC on RB2.

It is an advantage of the present invention that utilizing the START value of the Latest configured CN domain to initialize the HFNs of RB2 ensures that a fixed value is used by both the target RNC and the UE, since the START value of the Latest configured CN domain is the last value successfully sent by the UE to the serving RNC to configure a radio bearer. The HFNs on the UE and the target RNC are thus better assured of being synchronized, resulting in a greater likelihood of the SRNS relocation procedure being performed successfully.

These and other objectives of the present invention will no doubt become obvious to those of ordinary skill in the art after reading the following detailed description of the preferred embodiment, which is illustrated in the various figures and drawings.

DETAILED DESCRIPTION

In the following description, user equipment (UE) is a wireless communications device, and may be a mobile telephone, a handheld transceiver, a personal data assistant (PDA), a computer, or any other device that requires a wireless exchange of data. It is assumed that this wireless exchange of data conforms to 3GPP-specified protocols.

Figure 1:
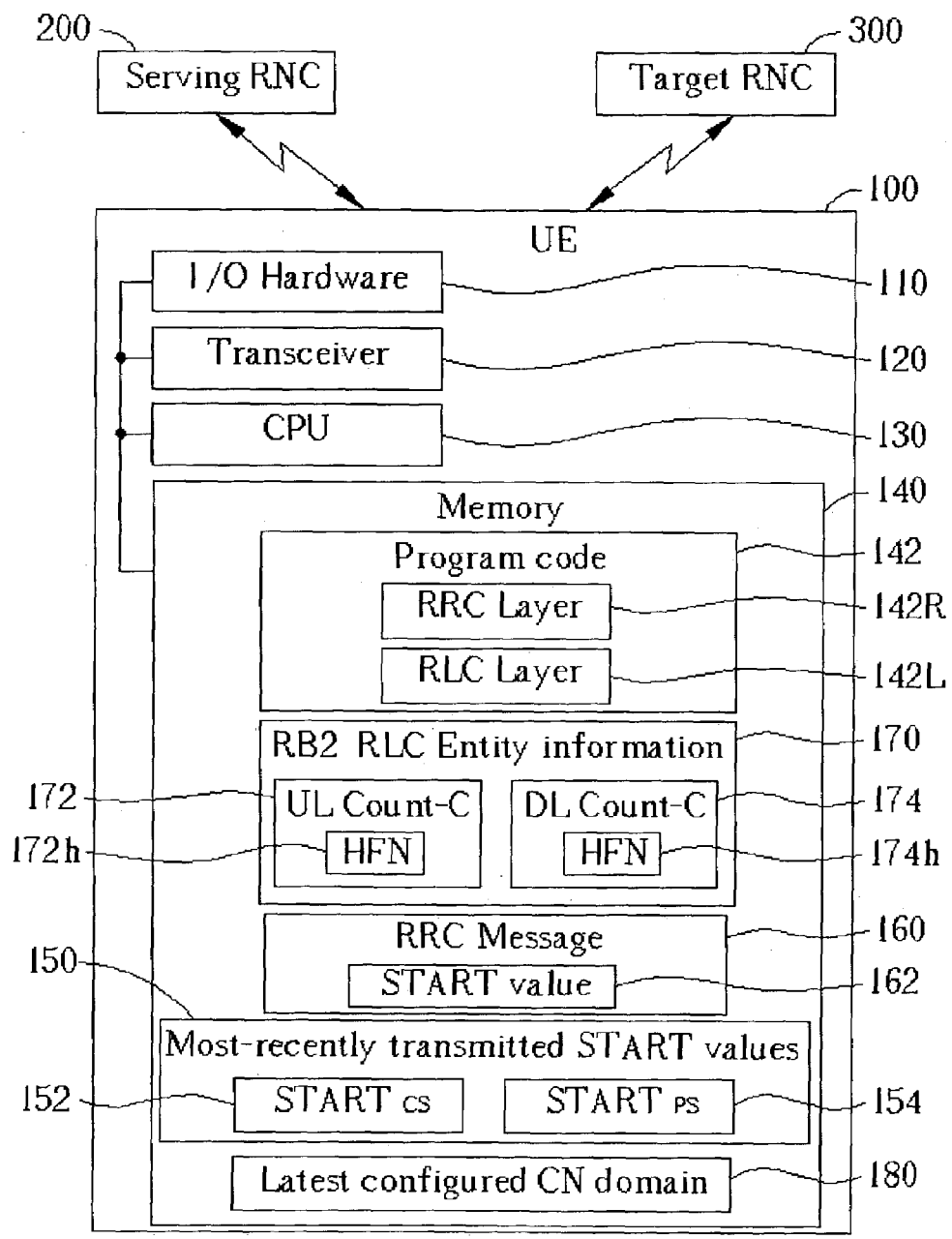
FIG. 1 is a simple block diagram of a wireless device according to a preferred embodiment of the present invention.

Please refer to FIG. 1. FIG. 1 is a simple block diagram of a wireless device 100 according to a preferred embodiment of the present invention, hereinafter termed the UE 100. The wireless device 100 may include input/output (I/O) hardware 110, a wireless transceiver 120 and memory 140 that are all connected to and under the control of a central processing unit (CPU) 130 in a manner familiar to those of regular skill in the art. The I/O hardware 110 may include, for example, a display and speaker for output, and a keypad and microphone for input. The wireless transceiver 120 enables the wireless device 100 to send and receive wireless signals. The CPU 130 controls the functionality of the wireless device 100 according to program code 142 contained within the memory 140 and executable by the CPU 130. The program code 142 implements a radio resource control (RRC) layer 142R according to the present invention method. In most aspects the wireless device 100, and in particular the RRC layer 142R, is identical to that of the prior art, but for modifications made to the program code 142 to implement the present invention method. How to effect such changes the program code 142 should be clear to one of ordinary skill in the art after reading the following detailed description of the present invention method.

As should be familiar to those of ordinary skill, the RRC layer 142R of the UE 100 frequently sends messages 160 to a Serving RNC 200 to configure radio bearers, and some of these messages 160 contain one or more START values 162 maintained by the UE 100. For the present invention method, each time the UE 100 receives confirmation that a message 160 containing a START value 162 for configuring a radio bearer was correctly received by the Serving RNC 200, the UE 100 refreshes one or both of most-recently transmitted START values 150, a START$_{CS}$ value 152 and a START$_{PS}$ value 154. The most-recently transmitted START values 150 hold the START value 162 for a CN domain that was most recently transmitted to the Serving RNC 200 for configuring a radio bearer in that CN domain and that was correctly received. As there are two CN domains, there are thus the two START values START$_{CS}$ 152 and START$_{PS}$ 154. Additionally, the UE 100 keeps track of the latest configured CN domain 180, which is the CN domain of a radio bearer that was most recently configured by the UE 100.

The UE 100 maintains information related to RB2, upon which the RRC messages 160 may be transmitted, and in particular, maintains radio link control (RLC) entity information 170. RB2 RLC entity information 170 includes an uplink (UL) COUNT-C 172, and a downlink (DL) COUNT-C 174. In a standard manner, the UL COUNT-C 172 includes a hyper-frame number (HFN) 172$h$, and similarly the DL COUNT-C 174 has an HFN 174$h$. In the first embodiment, instead of initializing the HFNs 172$h$, 174$h$ of the COUNT-C values 172, 174 for RB2 170 with the value of MAX (UL HFN component of COUNT-C of RB2, DL HFN component of COUNT-C of RB2)+1, the START value of the Latest configured CN domain included in the SRNS Relocation Info container transferred from the Source RNC to the Target RNC is used when the RLC entity of RB2 is re-established. Note that the START value of the latest configured CN domain included in the SRNS Relocation Info container corresponds to the most recently transmitted START value 152 or 154 in the UE 100 that is indicated by the latest configured CN domain 180. Hence, for the present invention, when re-establishing the RLC entity of RB2 170 in response to performing a SRNS relocation procedure, the UE 100 utilizes the most-recently transmitted START value 152, 154 indicated by the latest configured CN domain 180 to set the HFNs 172$h$, 174$h$. When the RLC layer 142L has confirmed the successful transmission of the response message 160 to a target RNC 300, the UE 100 then re-initializes the HFN components 172$h$, 174$h$ of the COUNT-C values 172, 174 of RB2 with the START value 162 of the Latest configured CN domain in the IE "START list" included in the response message 160. A flow chart of the first embodiment method is shown in FIG. 2.

Figure 3:
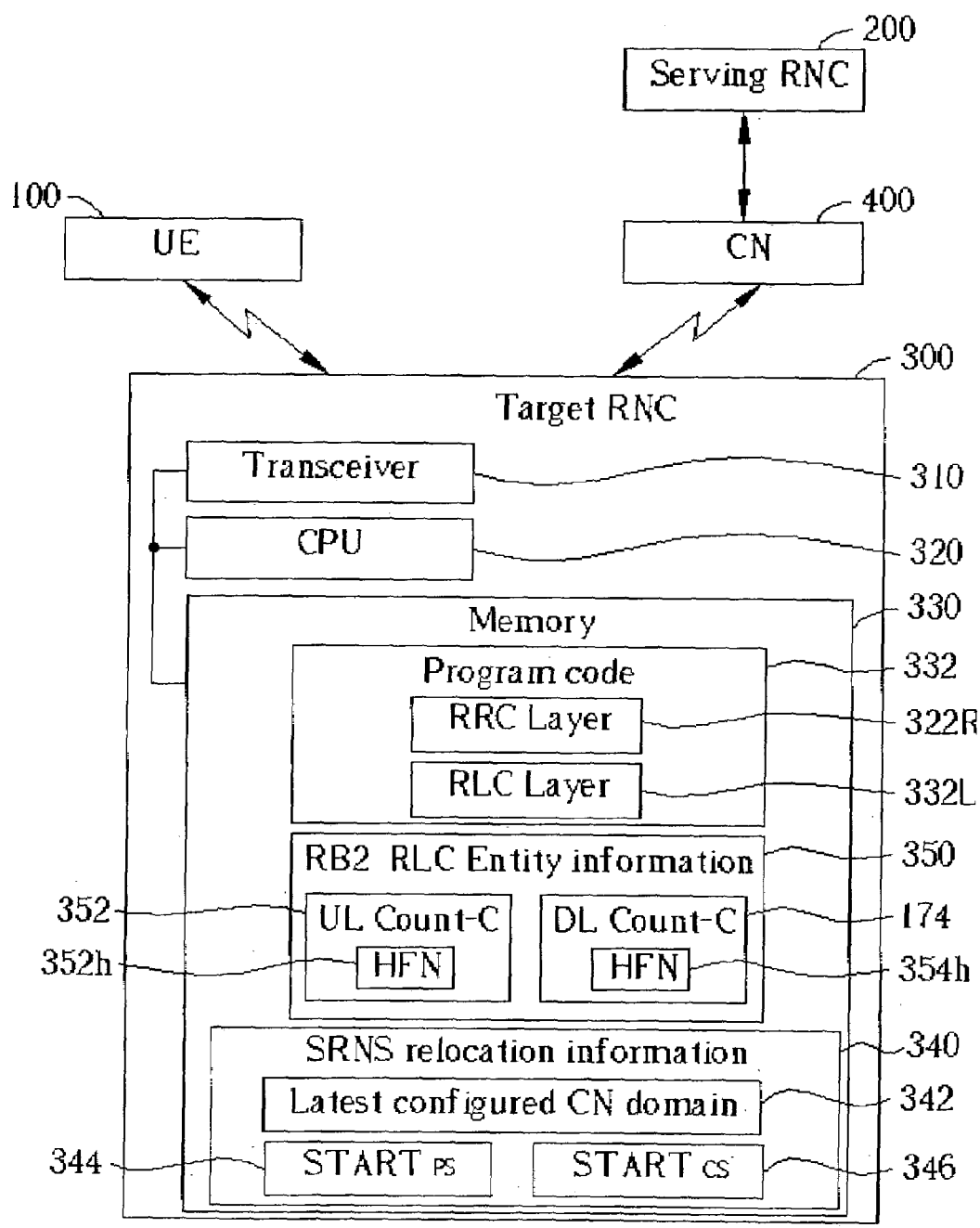
FIG. 3 is a simple block diagram of a target radio network controller (RNC) according to the first embodiment of the present invention method.

Please refer to FIG. 3. FIG. 3 is a simple block diagram of a target RNC 300 according to the first embodiment of the present invention method. The target RNC 300 includes a wireless transceiver 310 and memory 330 that are connected to and under the control of a CPU 320 in a manner familiar to those of regular skill in the art. The CPU 320 controls the functionality of the target RNC 300 according to program code 332 contained within the memory 330 and executable by the CPU 320. The program code 332 implements an RRC layer 332R and an RLC layer 332L. In most aspects the target RNC 300 is identical to that of the prior art, but for modifications made to the program code 332 to implement the present invention method. How to effect such changes to the program code 332 should be clear to one of ordinary skill in the art after reading the following.

To ensure synchronization with the UE 100, the target RNC 300 must initialize the RB2 RLC entity information 350 with values that are identical to those used by the UE 100. The target RNC 300 communicates with the serving RNC 200 via a CN 400 in a standard manner. In particular, to effect the SRNS procedure, the target RNC 300 receives a standard SRNS relocation information container 340 from the serving RNC 200. The SRNS relocation information container 340 includes the IE "START" of each CN domain and the Latest configured CN domain 342. As the CN 400 has only the two domains, a circuit switched (CS) domain, and a packet switched (PS) domain, there are two corresponding START values in the SRNS relocation information container 340: START$_{PS}$ 344 for the PS domain, and START$_{CS}$ 346 for the CS domain. Hence, in response to the SRNS relocation procedure with the UE 100, the target RNC 300 utilizes the START value 344, 346 indicated by the Latest configured CN domain 342 to initialize UL HFN 352$h$ and the DL HFN 354$h$ when establishing RB2 for the UE 100. Upon successful reception of the response message 160 from the UE 100, the target RNC 300 then re-establishes RB2, and utilizes the START value 162 of the Latest configured CN domain in the IE "START list" included in the response message 160 to set the HFNs 352$h$, 354$h$. A flow chart of the first embodiment method for the target RNC 300 is shown in FIG. 4.

Figure 2:
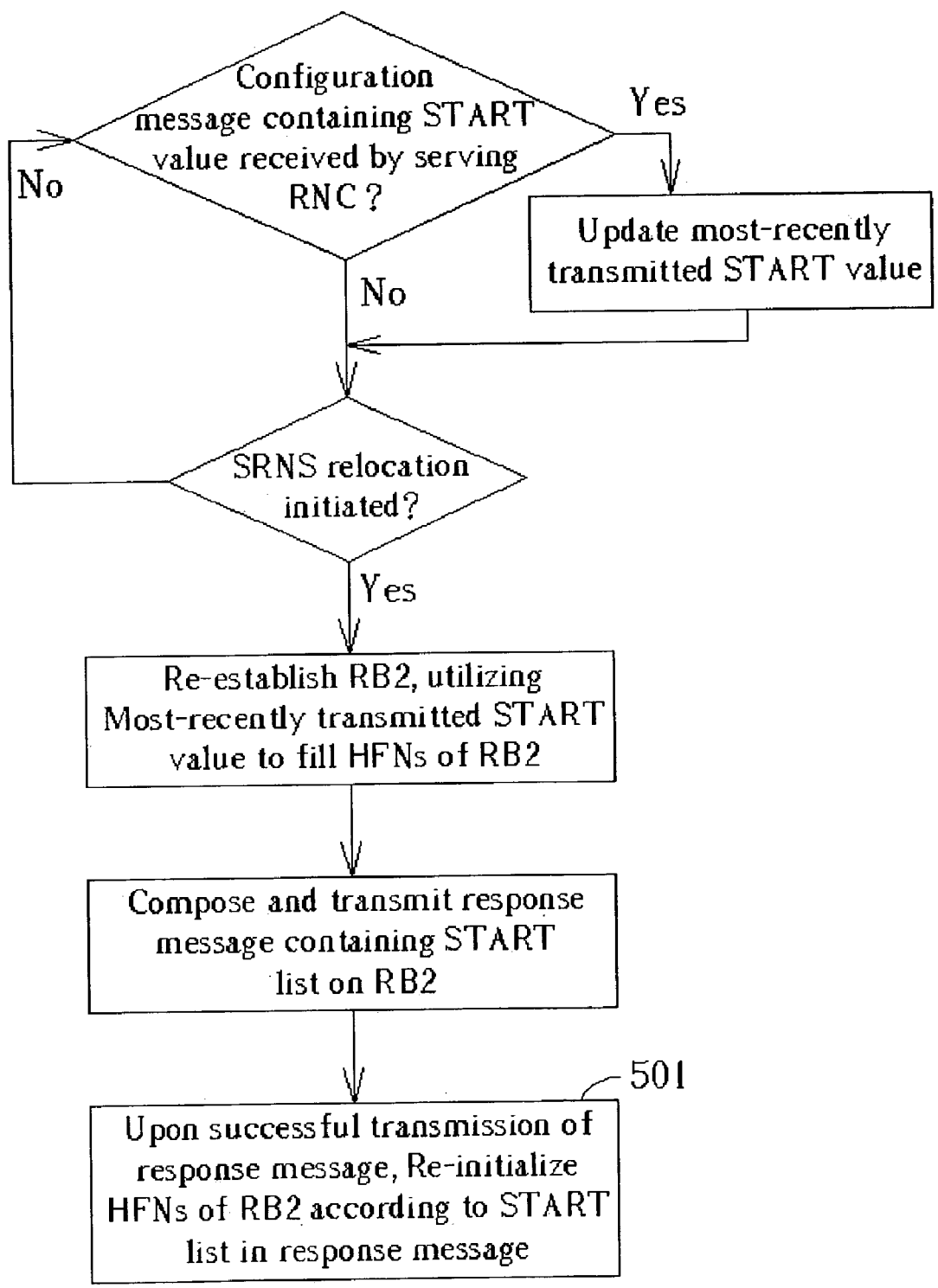
FIG. 2 is a flow chart of the first embodiment method of the present invention for the wireless device of FIG. 1.
Figure 4:
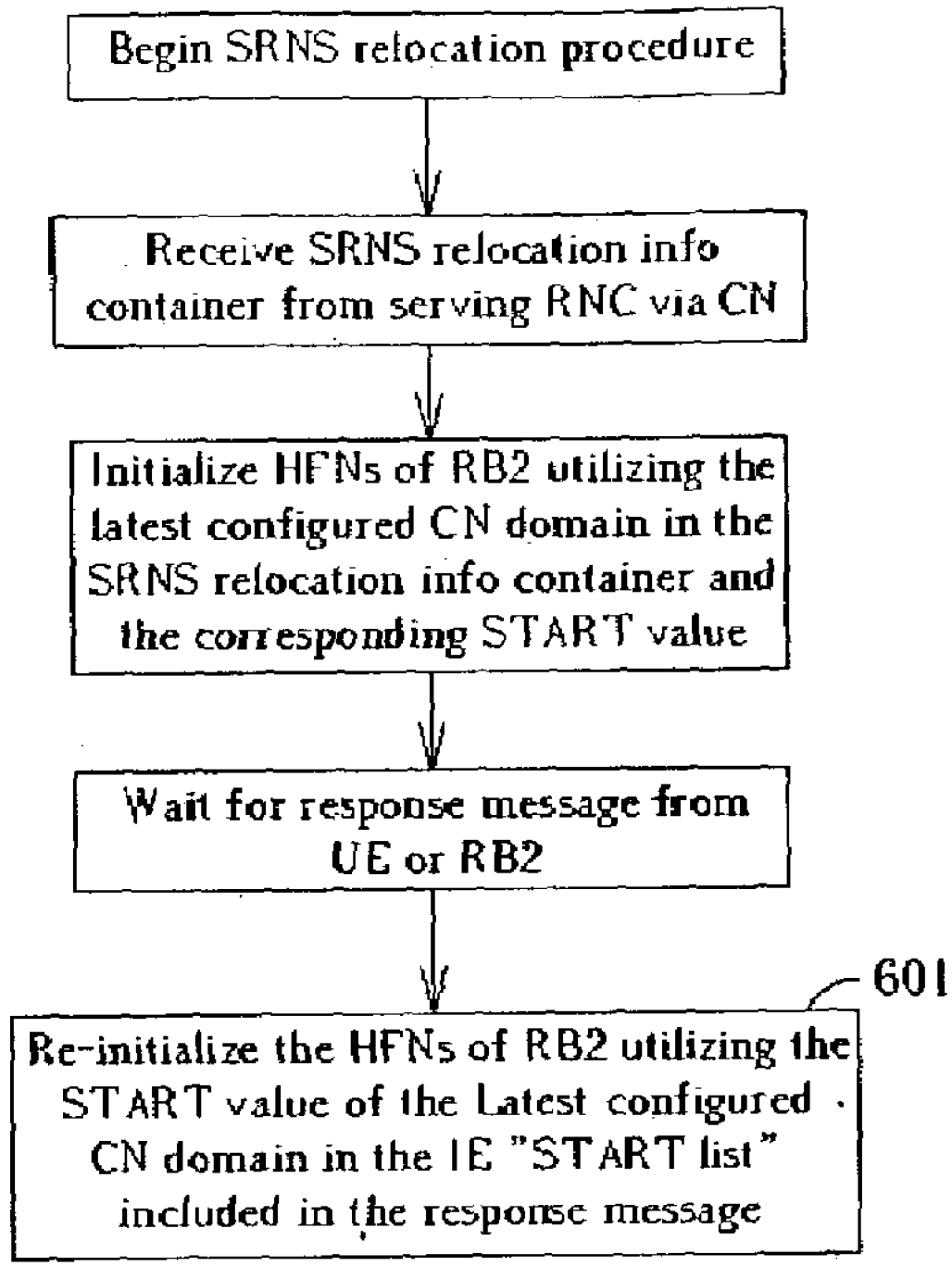
FIG. 4 is a flow chart of the first embodiment method of the present invention for the target RNC of FIG. 3.

In the second embodiment, the final steps 501 as shown in FIG. 2, and 601 as shown in FIG. 4, may be omitted. That is, the UE 100 may just initialize the HFNs 172$h$, 174$h$ of the COUNT-C values 172, 174 for RB2 with the value as specified in the first embodiment when the RLC entity of RB2 is re-established without re-initializing the HFN components 172$h$, 174$h$ when the RLC layer 142L has confirmed the successful transmission of the response message 160. Similarly, the target RNC 300 does not re-initialize the HFN components 352h, 354h when the RLC layer 332L has confirmed the successful reception of the response message 160.

In contrast to the prior art, the present invention utilizes the START value for the latest configured CN domain to initialise the UL and DL HFNs of both the target RNC and the UE for RB2. As a result of this, it is possible for the UL and DL HFNs to be initialised to a value that is in fact less than MAX (UL HFN of RB2, DL HFN of RB2)+1. However, utilizing this START value ensures that a fixed value is used to set the HFNs, rather than a variable value that could conceivably change between evaluation by the UE and evaluation by the serving RNC. HFN synchronization between the UE and the target RNC on RB2 is thus better assured.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for synchronizing hyper-frame numbers (HFNs) during a serving radio network subsystem (SRNS) relocation procedure, the method comprising:
   a wireless device transmitting a first START value to a serving radio network controller (RNC) and utilizing the first START value as a most-recently transmitted START value;
   initiating a SRNS relocation procedure between the wireless device, the serving RNC and a target RNC;
   in response to the SRNS relocation procedure, the serving RNC transmitting a SRNS relocation information container to the target RNC, the SRNS relocation information container comprising the first START value and a Latest configured core network (CN) domain value, wherein the Latest configured core network (CN) domain value indicates the first START value;
   in response to receiving the SRNS relocation information container, the target RNC utilizing the first START value indicated by the Latest configured CN domain value to initialize a HFN of a radio bearer (RB);
   in response to the SRNS relocation procedure, the wireless device re-establishing a corresponding RB and utilizing the most-recently transmitted START value to initialize a HFN of the corresponding RB; and
   the wireless device transmitting a response message to the target RNC on the corresponding RB.

2. The method of claim 1 wherein the HFN of the corresponding RB is initialized to a lesser value.

3. The method of claim 1 wherein the HFN of the RB is initialized to a lesser value.

4. The method of claim 1 further comprising:
   in response to determining successful reception of the response message by the target RNC, the wireless device re-initializing the HFN of the corresponding RB according to a START value in the response message; and
   in response to successfully receiving the response message, the target RNC re-initializing the HFN of the RB according to the START value in the response message.

5. The method of claim 1 wherein the wireless device transmits the first START value in a configuration message, and the wireless device saves the first START value as the most-recently transmitted START value upon detection of successful reception of the configuration message by the RNC.

6. A wireless device comprising a central processing unit (CPU) electrically connected to a memory, the memory containing program code executable by the CPU, the program code causing the CPU to perform the following steps:
   transmitting a first START value to a serving radio network controller (RNC) and utilizing the first START value as a most-recently transmitted START value;
   in response to a serving radio network subsystem (SRNS) relocation procedure, the wireless device re-establishing a radio bearer (RB) and utilizing the first START value to initialize a HFN of the RB; and
   in response to the SRNS relocation procedure, the wireless device transmitting a response message to a target RNC on the RB;
   wherein the RB is utilized to perform the SRNS relocation procedure.

7. The wireless device of claim 6 wherein the program code causes the HFN of the RB to be initialized to a lesser value.

8. The wireless device of claim 6 wherein the program code further causes the CPU to perform the following steps:
   in response to determining successful reception of the response message by the target RNC, re-initializing the HFN of the RB according to a START value in the response message.

9. The wireless device of claim 6 wherein the program code further causes the wireless device to transmit the first START value in a configuration message, and causes the wireless device to save the first START value as the most-recently transmitted START value upon detection of successful reception of the configuration message by the RNC.

10. A wireless device comprising a central processing unit (CPU) electrically connected to a memory, the memory containing program code executable by the CPU, the program code causing the CPU to perform the following steps:
   in response to a serving radio network subsystem (SRNS) relocation procedure, receiving a SRNS relocation information container from a serving radio network controller (RNC);
   in response to receiving the SRNS relocation information container, initializing a hyper-frame number (HFN) of a radio bearer (RB) according to a START value indicated by a Latest configured core network (CN) domain value stored in the SRNS relocation information container; and
   in response to the SRNS relocation procedure, receiving a response message from a user equipment (UE) on the RB;
   wherein the RB is utilized to perform the SRNS relocation procedure.

11. The wireless device of claim 10 wherein the program code causes the HFN of the RB to be initialized to a lesser value.

12. The wireless device of claim 10 wherein the program code further causes the CPU to perform the following steps:
   in response to successfully receiving the response message, re-initializing the HFN of the RB according to a START value in the response message.

* * * * *